(12) United States Patent
Cheng

(10) Patent No.: US 8,358,478 B1
(45) Date of Patent: *Jan. 22, 2013

(54) METHOD AND APPARATUS FOR WRITE PRECOMPENSATION IN A MAGNETIC RECORDING SYSTEM

(75) Inventor: Chi Fung Cheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 39 days.

This patent is subject to a terminal disclaimer.

(21) Appl. No.: 13/012,422

(22) Filed: Jan. 24, 2011

Related U.S. Application Data

(63) Continuation of application No. 12/538,056, filed on Aug. 7, 2009, now Pat. No. 7,880,986, which is a continuation of application No. 10/993,106, filed on Nov. 18, 2004, now Pat. No. 7,583,459.

(51) Int. Cl.
*G11B 5/02* (2006.01)
(52) U.S. Cl. ............... 360/25; 360/26; 360/31; 360/39; 360/65
(58) Field of Classification Search ................... None
See application file for complete search history.

(56) References Cited

U.S. PATENT DOCUMENTS

| | | | |
|---|---|---|---|
| 5,815,419 A * | 9/1998 | Fujitomi et al. | 708/290 |
| 5,986,830 A | 11/1999 | Hein | |
| 6,122,336 A * | 9/2000 | Anderson | 375/371 |
| 6,133,861 A | 10/2000 | Jusuf et al. | |
| 6,243,031 B1 | 6/2001 | Jusuf et al. | |
| 6,366,225 B1 | 4/2002 | Ozdemir | |
| 6,369,661 B1 * | 4/2002 | Scott et al. | 331/45 |
| 6,380,774 B2 | 4/2002 | Saeki | |
| 6,404,572 B1 | 6/2002 | Hong | |
| 6,493,403 B1 | 12/2002 | Driller et al. | |
| 6,519,103 B2 | 2/2003 | Cyrusian | |
| 6,552,865 B2 | 4/2003 | Cyrusian | |
| 6,583,655 B2 | 6/2003 | Takahashi et al. | |
| 6,594,094 B2 | 7/2003 | Rae et al. | |
| 6,600,615 B1 | 7/2003 | Ashley et al. | |
| 6,628,467 B2 | 9/2003 | Cyrusian | |
| 6,633,447 B2 | 10/2003 | Franck et al. | |
| 6,657,802 B1 | 12/2003 | Ashley et al. | |
| 6,661,590 B2 | 12/2003 | Cyrusian et al. | |
| 6,661,863 B1 | 12/2003 | Toosky | |
| 6,662,303 B1 * | 12/2003 | Toosky et al. | 713/400 |
| 6,697,204 B2 | 2/2004 | Cyrusian | |
| 6,714,603 B2 | 3/2004 | Ashley et al. | |
| 6,720,004 B2 | 4/2004 | Qiu et al. | |
| 6,721,114 B1 | 4/2004 | Sutardja et al. | |
| 6,753,712 B2 * | 6/2004 | Saeki | 327/165 |
| 6,788,485 B2 | 9/2004 | Ashley et al. | |
| 6,816,328 B2 | 11/2004 | Rae | |
| 6,889,154 B2 | 5/2005 | Ashley et al. | |
| 6,970,313 B1 * | 11/2005 | Fujiyama et al. | 360/51 |
| 7,002,764 B2 | 2/2006 | Musungu et al. | |
| 7,038,510 B2 * | 5/2006 | Zhang | 327/158 |
| 7,123,429 B2 | 10/2006 | Musungu et al. | |
| 7,165,000 B2 | 1/2007 | Ashley et al. | |
| 7,191,083 B2 | 3/2007 | Ashley et al. | |
| 7,197,101 B2 * | 3/2007 | Glenn et al. | 375/373 |
| 7,203,259 B2 | 4/2007 | Glenn et al. | |
| 7,403,584 B2 * | 7/2008 | Koenenkamp | 375/371 |

(Continued)

*Primary Examiner* — Dismery Mercedes

(57) ABSTRACT

A device is provided that, in one implementation, includes interpolators to generate interpolated phase shifted signals, and a precompensation circuit to provide precompensated versions of data bits in accordance with the interpolated phase shifted signals. Each of the interpolators is assigned a bit pattern different from that assigned to remaining ones of the interpolators.

19 Claims, 4 Drawing Sheets

U.S. PATENT DOCUMENTS

| | | |
|---|---|---|
| 7,555,091 B1 * | 6/2009 | Lewicki et al. ............... 375/376 |
| 2002/0000853 A1 | 1/2002 | Chen et al. |
| 2002/0015247 A1 * | 2/2002 | Rosky et al. ................... 360/45 |
| 2002/0079938 A1 * | 6/2002 | Saeki ............................ 327/165 |
| 2002/0085656 A1 | 7/2002 | Lee et al. |
| 2003/0002607 A1 | 1/2003 | Mooney et al. |
| 2003/0038659 A1 * | 2/2003 | Takahashi et al. ............ 327/141 |
| 2003/0058053 A1 | 3/2003 | Jeon et al. |
| 2004/0037373 A1 | 2/2004 | Ashley et al. |
| 2004/0052323 A1 * | 3/2004 | Zhang ........................... 375/375 |
| 2004/0201913 A1 | 10/2004 | Sutardja |
| 2005/0060616 A1 | 3/2005 | Cho et al. |
| 2005/0190473 A1 * | 9/2005 | Musungu et al. ............... 360/45 |
| 2005/0190474 A1 * | 9/2005 | Musungu et al. ............... 360/45 |

* cited by examiner

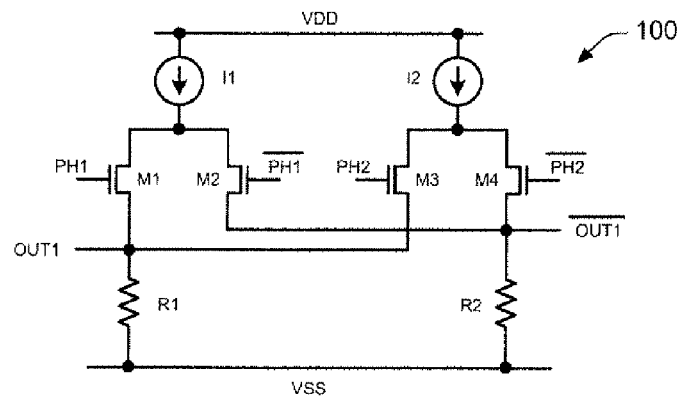
FIG._1
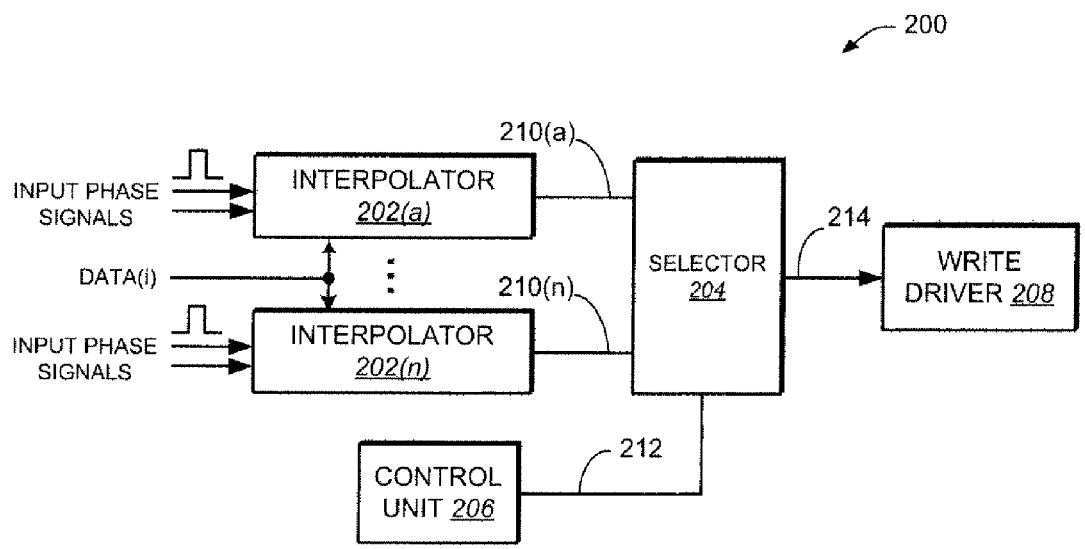
FIG._2

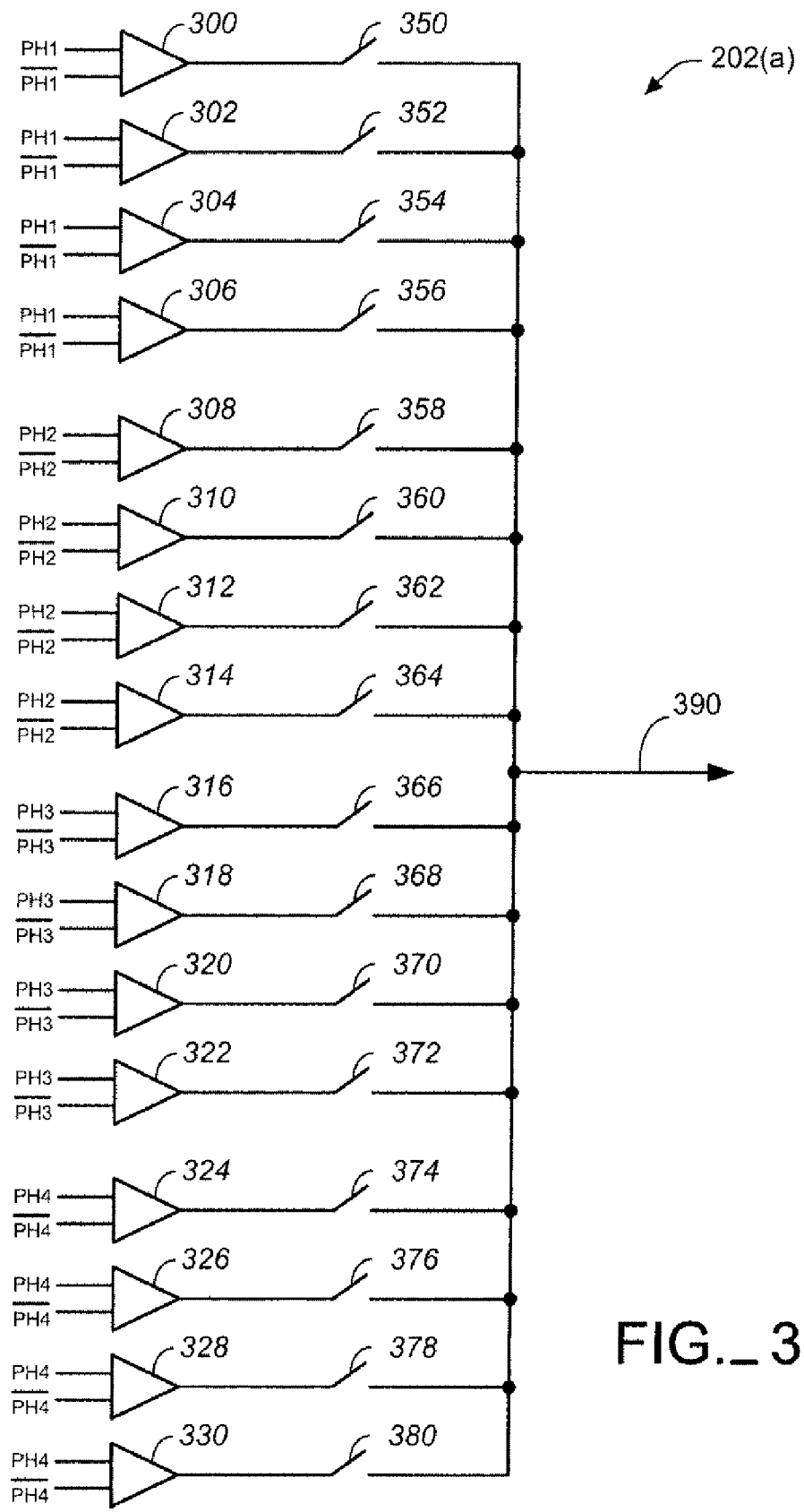
FIG._3

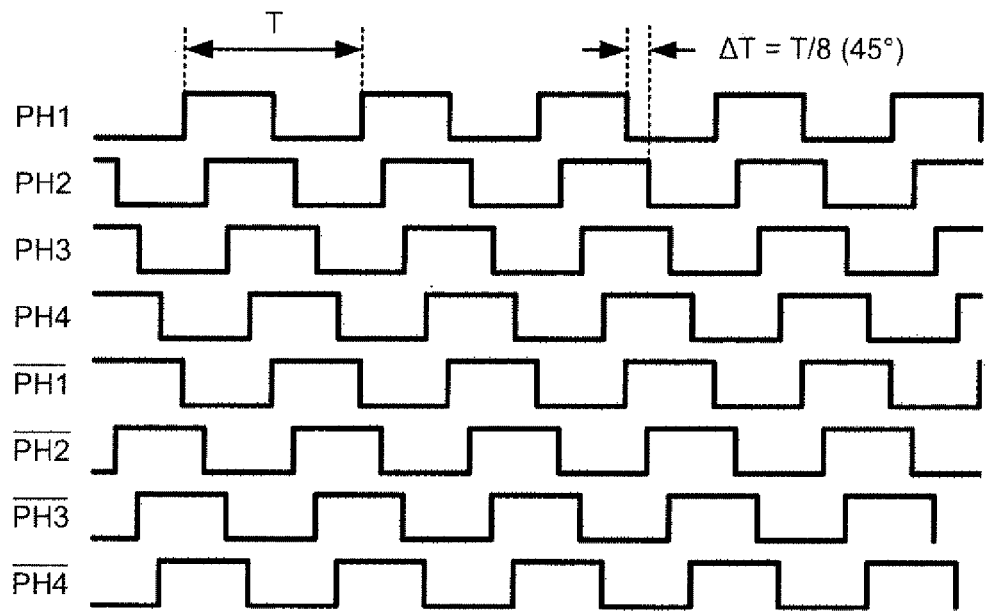
FIG._4
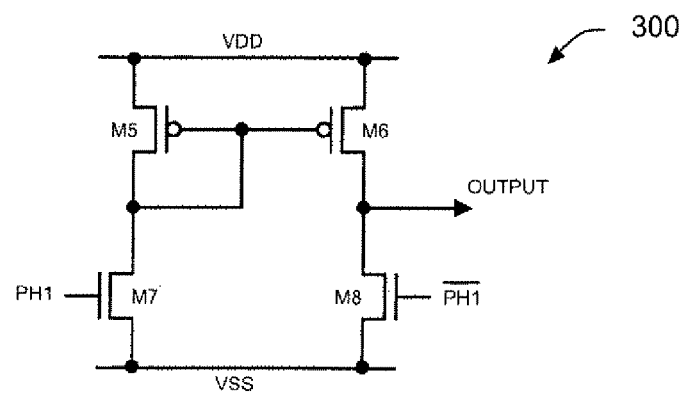
FIG._5

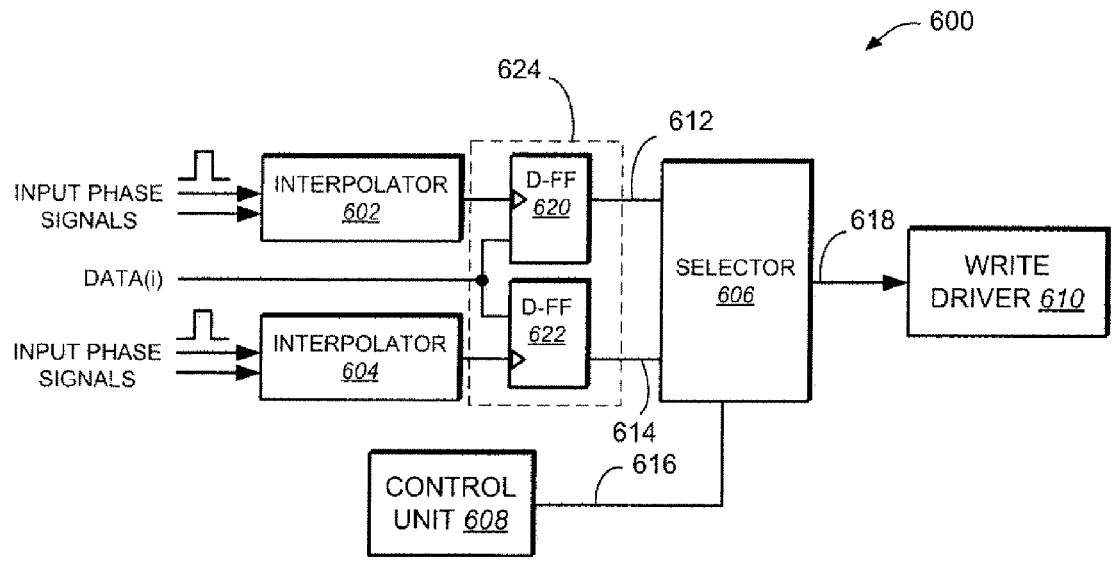
FIG._6
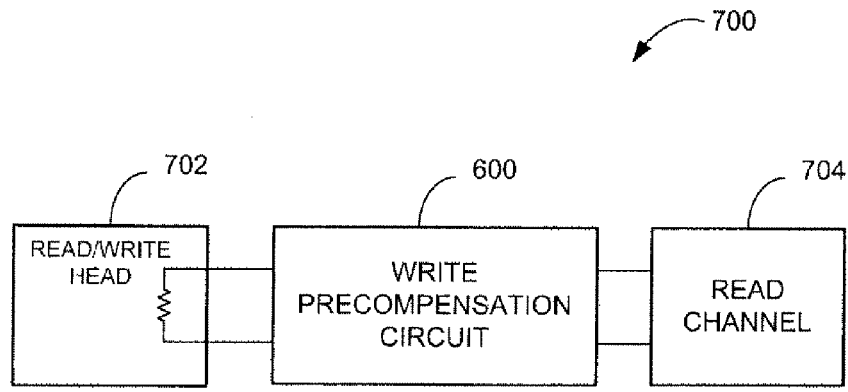
FIG._7

US 8,358,478 B1

METHOD AND APPARATUS FOR WRITE PRECOMPENSATION IN A MAGNETIC RECORDING SYSTEM

CROSS-REFERENCE TO RELATED APPLICATIONS

This application is a continuation of U.S. application Ser. No. 12/538,056, filed Aug. 7, 2009, which is a continuation of U.S. application Ser. No. 10/993,106, filed Nov. 18, 2004. The disclosures of the applications referenced above are incorporated herein by reference.

BACKGROUND

The following disclosure relates to electrical circuits and signal processing.

In a magnetic recording system (e.g., a magnetic recording channel), data is typically written on or read from one or more data tracks of a magnetic storage medium such as a hard disk. The data tracks generally form concentric rings on the surface of the hard disk. When writing data onto a data track, a hard disk is rotated at a predetermined speed, and electrical signals applied to a magnetic read/write head floating over the data track are converted to magnetic transitions on the data track. The magnetic transitions can represent encoded digital data. For example, each transition (e.g., a rising edge or a falling edge) can correspond to a ONE bit value and the absence of a transition can correspond to a ZERO bit value, realizing a non return to zero inverted (NRZI) encoding of the data.

To obtain high density recording, magnetic transitions representing data bits are closely packed onto a magnetic storage medium. Such closely packed data bits may influence each other so that a non-linear magnetic shifting of transitions and bit interference may occur during recording. As a result, the reading of the high density recorded data bits may be adversely affected.

When writing data onto a high density magnetic recording medium, the position of transitions in a data stream can be adjusted (or precompensated) by a write precompensation circuit to correct for the influence of nearby transitions so that transitions in a recovered data stream are evenly placed. Precompensation of data being recorded can include offsetting a magnetic transition shift. The offset of the magnetic transition shift of a bit due to the pattern of preceding and/or succeeding bits can be anticipated and the bit recording time changed to compensate for the magnetic transition shift due to the effects of surrounding bits.

A typical write precompensation circuit has plural interpolators, each providing a predetermined delay (or phase shift) of a write clock cycle for a magnetic transition shift according to a given data bit pattern. For example, in the recording of a data stream, one of the interpolators can be selected to provide a predetermined phase shift (early, nominal, or late) of a write clock cycle for recording a present data bit according to one or more data bit patterns surrounding the present data bit.

FIG. 1 shows a conventional interpolator 100 of a write precompensation circuit. Interpolator 100 includes a differential pair having a pair of differential inputs PH1, PH1Bar (complement of PH1), PH2, PH2Bar (complement of PH2), and differential outputs OUT1, OUT1Bar (complement of OUT1). Interpolator 100 includes bias currents I1-I2, transistors M1-M4, and resistors R1-R2. In general, interpolator 100 provides a phase shift for a write clock cycle that is an interpolation between phase signals PH1 and PH2. Interpolator 100 provides the phase shift based on bias currents I1 and I2. For example, if bias current I1 is turned off, then interpolator 100 provides a phase shift that is substantially equal to that of phase signal PH2. And if bias currents I1 and I2 are substantially equal, then interpolator 100 provides a phase shift that is substantially in between those of phase signals PH1 and PH2.

As bias current I1 or I2 is changed, a common mode component of output signals OUT1 and OUT1Bar varies, and interpolator 100 therefore requires a certain amount of time to settle in order to output an accurate phase shift. The time to settle can be on the order of a few clock cycles. To avoid such delays due to settling, conventional write precompensation circuits typically require $2^N$ interpolators, in which each interpolator provides a different phase shift for precompensation of a predetermined data pattern of N data bits. Accordingly, while four interpolators (for generating four different phase shifts) are needed to precompensate a corresponding (2) data bit pattern (e.g., [00], [01], [10] and [11]), the number of required interpolators increases as the data bit pattern is increased. For example, in a conventional write precompensation circuit, eight interpolators are needed to precompensate a (3) data bit pattern and sixteen interpolators are needed to precompensate a (4) data bit pattern. The increased number of interpolators to precompensate larger data bit patterns may add to the cost and complexity of a magnetic recording system.

SUMMARY

In general, in one aspect, this specification describes a write precompensation circuit including a plurality of interpolators. Each interpolator is operable to receive a plurality of groups of one or more phase signals and generate a plurality of interpolated phase shifted signals. Each group of phase signals have a different phase relative to other groups of one or more phase signals. The write precompensation circuit further includes a precompensation circuit and a selector. The precompensation circuit is operable to receive a data stream including one or more data bits and precompensate each data bit in accordance with a given interpolated phase shifted signal. The selector is operable to select a precompensated data bit output from the precompensation circuit.

Particular implementations can include one or more of the following. Each interpolated phase shifted signal generated by the plurality of interpolators can not have an associated common mode component or can not contain a current bias. Each of the plurality of interpolators can be operable to generate a given interpolated phase shifted signal corresponding to one or more data bit patterns assigned to each interpolator. The one or more data bit patterns can be assigned to each interpolator based on a criteria. The criteria can allow for at least a 2 clock cycle settling time before a given interpolator is selected to provide a next interpolated phase shifted signal. The multiplexer can be operable to select a precompensated data bit based on a data bit pattern. The data: bit pattern can be one of a (2) bit data pattern, a (3) bit data pattern, or a (4) bit data pattern. The selector can be a multiplexer.

The write precompensation circuit can further include a write driver operable to receive the selected precompensated data bit and record the precompensated data bit onto a magnetic medium. The precompensation circuit can include a latch or flip-flop operable to precompensate each data bit. The flip-flop can be one of a D flip-flop, a T flip-flop, SR flip-flop, or a JK flip-flop. Each interpolator can include a plurality of phase input circuits and a plurality of switches corresponding to the plurality of phase input circuits. Each phase input circuit can be operable to receive a given phase signal. Each switch can be operable to couple a given phase signal to an output of the interpolator for interpolation. Each phase input circuit can be operable to convert a differential phase signal into a single-ended phase signal.

In general, in another aspect, this specification describes an interpolator. The interpolator includes an output node operable to provide an interpolated output signal. The interpolator further includes a plurality of phase input circuits and a plurality of switches corresponding to the plurality of phase input circuits. Each phase input circuit is operable to receive a given phase signal. Each switch is operable to couple a given phase signal to the output node. Each phase signal coupled to the output node by the plurality of switches are joined to form the interpolated output signal.

In general, in another aspect, this specification describes a disk drive system. The disk drive system includes a read channel, a write precompensation circuit, and a read/write head. The read channel is configured to provide a data stream to be recorded onto a surface of a disk. The write precompensation circuit is operable to precompensate each data bit of the data stream. The write precompensation circuit includes a plurality of interpolators, in which each interpolator is operable to receive a plurality of groups of one or more phase signals and generate a plurality of interpolated phase shifted signals. Each group of phase signals has a different phase relative to other groups of one or more phase signals. The interpolator further includes a precompensation circuit and a multiplexer. The precompensation circuit is operable to receive each data bit of the data stream and precompensate each data bit in accordance with a given interpolated phase shifted signal. The multiplexer is operable to select a precompensated data bit output from the precompensation circuit. The read/write head is operable to write each selected precompensated data bit onto the surface of the disk.

Implementations can include one or more of the following advantages. An interpolator circuit is provided that does not include a current bias and which has an output that does not contain a common mode component. The interpolator therefore has a quick settling time in providing differing phase shifts for precompensating a data bit. In one implementation, a write precompensation circuit is provided that includes a predetermined number of interpolators that is independent of a size of data bit patterns used for precompensation. In one implementation, a phase interpolator is provided that has reduced pulse pairing errors. Pulse pairing errors result from an asymmetry between positive and negative flux transitions—i.e., a different delay for rising and falling edges.

The details of one or more implementations are set forth in the accompanying drawings and the description below. Other features and advantages will be apparent from the description and drawings, and from the claims.

DESCRIPTION OF DRAWINGS

FIG. 1 is a schematic diagram of a conventional interpolator of a write precompensation circuit.

FIG. 2 is block diagram of a write precompensation circuit.

FIG. 3 is a schematic diagram of an interpolator of FIG. 2.

FIG. 4 is a timing diagram illustrating the phase signals of the interpolator of FIG. 3.

FIG. 5 is a schematic diagram of a phase signal input circuit of the interpolator of FIG. 3.

FIG. 6 is block diagram of a write precompensation circuit.

FIG. 7 is a schematic block diagram of a hard disk drive system.

Like reference symbols in the various drawings indicate like elements.

DETAILED DESCRIPTION

FIG. 2 illustrates a block diagram of write precompensation circuit 200. In one implementation, write precompensation circuit 200 receives successive data bits and precompensates each data bit DATA(i) according to a bit pattern of one or more preceding data bits DATA(i−1), DATA(i−2), DATA(i−3), and so on, as discussed in greater detail below. Write precompensation circuit 200 can also precompensate each data bit DATA(i) according to a bit pattern including one or more succeeding data bits, e.g., data bits DATA(i+1), DATA(i+2), DATA(i+3), and so on.

Write compensation circuit 200 includes one or more interpolators 202(a)-202(n), a selector 204, a control unit 206 and a write driver 208. An output of each of interpolators 202(a)-202(n) is in communication with an input of selector 204. A control input of selector 204 is in communication with control unit 206. An output of selector 204 is in communication with an input of write driver 208.

Each interpolator 202(a)-202(n) includes circuitry for generating one or more interpolated phase shifted signals to precompensate a given data bit DATA(i). Each interpolator 202(a)-202(n) generates a given interpolated phase shifted signal based on one or more input phase signals without using any current biases, and provides the phase shifted signal on a single-ended output, as discussed in greater detail below. Unlike a conventional interpolator that may include one or more current biases and/or a differential output, each interpolator 202(a)-202(n) does not require settling time in order to provide different interpolated phase shifted signals for write precompensation.

In one implementation, selector 204 receives precompensated data bits 210(a)-210(n) from each of interpolators 202(a)-202(n), respectively, and provides a selected precompensated data bit 214 to write driver 208 for recording onto a magnetic storage medium (not shown). Selector 204 is operable to select one of precompensated data bits 210(a)-210(n) in response to a control signal 212 from control unit 206. Selector 204 can be a multiplexer. In one implementation, control unit 206 includes circuitry for generating control signal 212 based on a bit pattern of one or more preceding data bits DATA(i−1), DATA(i−2), DATA(i−3) and so on. For example, in a 2-bit look ahead implementation, control unit 206 can generate control signal 212 based on data bits DATA (i−1) and DATA(i−2). Control unit 206 can also include circuitry for generating control signal 206 in accordance with a bit pattern including one or more succeeding data bits, e.g., data bits DATA(i+1), DATA(i+2), DATA(i+3) and so on.

FIG. 3 illustrates one implementation of interpolator 202 (a). In one implementation, interpolator 202(a) includes phase input circuits 300-330 and switches 350-380. Switches 350-380 can include CMOS transistors (e.g., PMOS or NMOS transistors). Though interpolator 202(a) is shown as having (16) phase input circuits 300-330 and (16) corresponding switches 350-380, interpolator 202(a) can contain any number of phase input circuits and corresponding switches to provide various granularities of resolution of a (interpolated) phase shifted signal. For example, in one implementation, interpolator 202(a) includes (8) phase input circuits and (8) corresponding switches for each differential pair of input phase signals. In one implementation, each phase input circuit includes circuitry for converting a pair of differential phase input signals (e.g., phase signals PH1-PH1Bar) into only a single-ended phase signal (e.g., phase signals PH1).

Each phase input circuit 300-306 has a first input in communication with phase signal PH1 and a second input in communication with phase signal PH1Bar (complement of PH1). Each phase input circuit 308-314 has a first input in communication with phase signal PH2 and a second input in communication with phase signal PH2Bar. Each phase input circuit 316-322 has a first input in communication with phase signal PH3 and a second input in communication with phase signal PH3Bar. Each phase input circuit 324-330 has a first input in communication with phase signal PH4 and a second input in communication with phase signal PH4Bar. An output of each phase input circuit 300-330 is in communication with an input of switches 350-380, respectively. An output of each of switches 350-380 is coupled together to form a single-ended output 390. Output 390 represents an interpolated phase shifted signal based on one or more of phase signals PH1-PH4.

FIG. 4 shows a timing diagram, for one implementation, of phase signals PH1-PH4, PH1Bar-PH4Bar (respective complements of PH1-PH4). As shown in FIG. 4, each phase signal PH1-PH4, PH1Bar-PH4Bar has a delay time of $\Delta T^*(i+1)$ [i=0, 1, ..., 0] with respect to phase signal PH1. In the example of FIG. 4, in which a cycle of PH1 is T, the delay time $\Delta T$ is approximately equal to T/8 (e.g., 45°).

In operation, interpolator 202(a) provides an interpolated output (e.g., output 390) based on a setting of switches 350-380. For example, to provide an interpolated output between phase signal PH1 and PH2, interpolator 202(a) can operate as follows. Phase input circuits 300-306 respectively convert a group of (e.g., four) differential input phase signals PH1-PH1Bar into a single-ended phase signal PH1 and phase input circuits 308-314 respectively convert a group of differential input phase signals PH2-PH2Bar into a single-ended phase signal PH2. A group of differential input phase signals can contain one or more differential input phase signals. Further, interpolator 202(a) closes at least one of switches 350-364 and opens at least one of switches 366-380 to generate an interpolated output (e.g., output 390) having a phase between those of phase signals PH1 and PH2. To provide a interpolated output having a phase closer to that of phase signal PH2, interpolator 202(a) can close, e.g., each of switches 358-360 and switch 356, while leaving switches 350-354 and 366-380 open. The interpolated output can be combined with a given data bit (e.g., data bit DATA (i)) using conventional techniques to generate a precompensated data bit (e.g., precompensated data bit 210(a) of FIG. 2). The interpolated output can be combined with a given data bit through a precompensation circuit that includes a latch or flip-flop. In one implementation, a D flip-flop is used to generate a precompensated data bit, as discussed in greater detail below. Other types of flip-flops can be used within the precompensation circuit, e.g., a T flip-flop, SR flip-flop, or a JK flip-flop.

FIG. 5 illustrates one implementation of phase input circuit 300. In one implementation, phase input circuit includes PMOS transistors M5-M6 and NMOS transistors M7-M8. A gate input of NMOS transistor M7 is in communication with phase signal PH1 and a gate input of NMOS transistor M8 is in communication with phase signal PH1Bar. A source of each NMOS transistor M7-M8 is in communication with a low voltage source VSS (e.g., 0 Volts). A drain of NMOS transistor M7 is in communication with a drain and a gate input of PMOS transistor M5 and a gate input of PMOS transistor M6. A source of each PMOS transistor M5-M6 is in communication with a high voltage source VDD (e.g., 1.2 Volts). A drain of NMOS transistor M8 is in communication with a drain of PMOS transistor M6. The drain of PMOS transistor M6 forms an output of phase input circuit 300.

Phase input circuit 300 converts a differential input signal (e.g., phase signals PH1-PH1Bar) into a single-ended signal (e.g., phase signal PH1) as follows. As NMOS transistor M7 is enabled (e.g., turned on) (by a rising transition of phase signal PH1), NMOS transistor M8 is turned off (by a falling edge of phase signal PH1Bar). The gates of each of PMOS transistors M5-M6 are pulled low (e.g., to ground) through NMOS transistor M7, and each of PMOS transistors are turned on. The output of phase input circuit is pulled high (e.g., to VDD) through PMOS transistor M6. As NMOS transistor M7 is turned off by a falling transition of phase signal PH1, NMOS transistor M8 is turned on by a rising edge of phase signal PH1Bar. The output of phase input circuit 300 is pulled low through NMOS transistor M8. The output of phase input circuit 300 therefore tracks the rising and falling edges of phase signal PH1. The output of phase circuit 300 does not contain a common mode component, and, therefore, the output settles quickly to a steady value.

FIG. 6 illustrates one implementation of a write precompensation circuit 600. Write precompensation circuit 600 includes two interpolators 602, 604, D flip-flops (D-FFs) 620, 622, a selector 606, a control unit 608 and a write driver 610. D flip-flops (D-FFs) 620, 622, form a precompensation circuit 624. In one implementation, write precompensation circuit 600 includes at least two interpolators to prevent a loss of a write clock pulse when consecutive data bit patterns require a write clock shift of ½T and −½T within a single clock cycle.

Interpolator 600 generally operates substantially the same as write precompensation circuit 200 of FIG. 2. That is, each interpolator 602, 604 includes circuitry for generating one or more interpolated phase shifted signals to precompensate a given data bit DATA(i). Selector 606 receives precompensated data bits 612, 614 from each of interpolators 602, 604, respectively, and provides a selected precompensated data bit 618 to write driver 610 for recording onto a magnetic storage medium (not shown). Selector 204 is operable to select one of precompensated data bits 210(a)-210(n) in response to a control signal 212 from control unit 206.

In one implementation, each interpolator 602, 604 is operable to provide a given interpolated phase shifted signal corresponding to data bit patterns (or transitions). In one implementation, each interpolator 602, 604 is operable to provide a given interpolated phase shifted signal corresponding to one or more data bit patterns assigned to each interpolator 602, 604. Which data patterns assigned to a given interpolator 602, 604 depends on a criteria. In one implementation, the criteria used to assign a data pattern to an interpolator allows for at least a 2 clock cycle settling time before the interpolator is selected to provide a next interpolated phase shifted signal. For example, in a (2) bit pattern implementation, interpolator 602 provides an interpolated phase shifted signal for each of data patterns [00], [10], and [11], while interpolator 604 provides an interpolated phase shifted signal corresponding to data pattern [01]. In a (3) bit pattern implementation, interpolator 602 provides an interpolated phase shifted signal for each of data patterns [000], [010], [011], [100], and [110]; interpolator 604 provides an interpolated phase shifted signal for each of data patterns [001], [101], and [111]. In a (4) bit pattern implementation, interpolator 602 provides an interpolated phase shifted signal for each of data patterns [0000], [0010], [0011], [0100], [0110], [1000], [1010], [1011], [1100], [1110], and [1111]; interpolator 604 provides an interpolated phase shifted signal for each of data patterns [0001], [0101], [0111], [1001], and [1101]. Accordingly, each interpolator 602, 604 therefore has at least 2 clock cycles to settle before providing a next interpolated phase shifted signal. According to one particular transition—i.e., a [11] to [11] transition or a [111] to [111] transition, and so on—a given interpolator must provide an interpolated output (interpolated phase shifted signal) within a single clock cycle delay. In this case, however, because each interpolator output does not contain a common mode component, each interpolator can provide a steady interpolated output within a single clock cycle. Such a quick settling time reduces pulse pairing errors.

In one implementation, precompensated data bits 612, 614 are respectively generated through D-FFs 620, 622. More specifically, D-FFs 620, 622 receive as input data bits DATA (i), and the output of interpolators 602, 604 are used to respectively clock data bits DATA(i) through D-FFs 620, 622 to generate precompensated data bits 612, 614. In one implementation, only a single D-FF (not shown) is used to generate precompensated data bits. In such an implementation, MUX 606 selects an interpolated output directly from one of interpolators 602, 604. The selected interpolated output is used to clock the single D-FF to generate the precompensated data bits.

Write precompensation circuits 200, 600 can be used with circuitry of a disk drive system 700, as shown in FIG. 7. Disk drive system 700 includes a read/write head 702, a write precompensation circuit (e.g., precompensation circuits 600) and a read channel 704.

In a write operation, an data stream to be recorded is provided by read channel 704 to write precompensation circuit 600. Write precompensation circuit precompensates each data bit of the data stream and provides precompensated data to read/write head 702. Read/write head 702 locates an appropriate sector of a disk (not shown) and writes the precompensated data onto the disk.

A number of implementations have been described. Nevertheless, it will be understood that various modifications may be made without departing from the spirit and scope of the invention. For example, the step of methods described above may be performed in a different order and still achieve desirable results. Accordingly, other implementations are within the scope of the following claims.

What is claimed is:

1. A device comprising:
   interpolators to generate interpolated phase shifted signals; and
   a precompensation circuit to provide precompensated versions of data bits in accordance with the interpolated phase shifted signals;
   wherein each of the interpolators is assigned a bit pattern different from that assigned to remaining ones of the interpolators; and
   wherein the different bit patterns are assigned to the interpolators to allow for a settling time of at least two clock cycles before any one of the interpolators is selected to provide a next phase shifted signal.

2. The device of claim 1, wherein the precompensation circuit comprises at least one flip-flop.

3. The device of claim 2, wherein the flip-flop is one of a D flip-flop, a T flip-flop, an SR flip-flop, and a JK flip-flop.

4. The device of claim 2, wherein the at least one flip-flop comprises two flip-flops coupled between a selector and outputs of the interpolators.

5. The device of claim 4, wherein the selector comprises a multiplexer.

6. The device of claim 1, wherein the assigned bit pattern is one of a 2-bit data pattern, a 3-bit data pattern, or a 4-bit data pattern.

7. The device of claim 1, further comprising a write driver operable to receive the precompensated versions of the data bits and record the precompensated versions of the data bits onto a magnetic medium.

8. An interpolator comprising:
   an output node to provide an interpolated output signal;
   phase input circuits, each of the phase input circuits to receive a phase signal; and
   switches corresponding to the phase input circuits, each of the switches coupled with a corresponding phase input circuit to provide a corresponding phase signal to the output node;
   wherein phase signals provided to the output node are joined to form the interpolated output signal, the interpolated output signal does not have an associated common mode component, and the interpolator does not contain a current bias.

9. A write precompensation circuit comprising the interpolator of claim 8.

10. A disk drive system, comprising:
    a read channel configured to provide a data stream to be recorded onto a surface of a disk;
    a write precompensation circuit operable to precompensate each data bit of the data stream, the write precompensation circuit comprising the interpolator of claim 8.

11. The interpolator of claim 8, wherein the interpolator provides the interpolated output signal within a single clock cycle.

12. The interpolator of claim 8, wherein the interpolator has settling time of 2 clock cycles before providing the interpolated output signal.

13. A method, comprising:
    receiving a plurality of groups of one or more phase signals, each group of one or more phase signals having a different phase relative to other groups of one or more phase signals;
    generating a plurality of interpolated phase shifted signals based on the plurality of groups of one or more phase signals;
    receiving a data stream including one or more data bits and precompensating each data bit in accordance with a given interpolated phase shifted signal; and
    selecting a precompensated data bit to be recorded onto a magnetic medium;
    wherein generating the plurality of interpolated phase shifted signals includes generating a plurality of interpolated phase shifted signals that do not have an associated common mode component.

14. The method of claim 13, wherein generating the plurality of interpolated phase shifted signals includes generating a given interpolated phase shifted signal corresponding to one or more data bit patterns.

15. The method of claim 13, wherein selecting a precompensated data bit includes selecting a precompensated data bit based on a data bit pattern.

16. The method of claim 15, wherein the data bit pattern is one of a (2) bit data pattern, a (3) bit data pattern, or a (4) bit data pattern.

17. The method of claim 13, further comprising receiving the selected precompensated data bit and recording the precompensated data bit onto the magnetic medium.

18. The method of claim 13, wherein generating the plurality of interpolated phase shifted signals includes receiving a given phase signal and coupling the given phase signal to an output node of an interpolator for interpolation.

19. The method of claim 13, wherein generating the plurality of interpolated phase shifted signals includes converting differential phase signals into single-ended phase signals.

* * * * *